(12) United States Patent
Torikka et al.

(10) Patent No.: US 6,937,577 B1
(45) Date of Patent: Aug. 30, 2005

(54) METHOD, ARRANGEMENT AND APPARATUS FOR TELECOMMUNICATIONS

(75) Inventors: Tapani Aleksi Torikka, Espoo (FI); Niko Tyni, Helsinki (FI); Jan Hågland, Stockholm (SE); Peter Carl Birger Lundh, Skärholmen (SE); Carl Magnus Thornberg, Tokyo (JP); Kari Antero Lehto, Helsinki (FI); Arto Juhani Mahkonen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/272,621

(22) Filed: Mar. 19, 1999

Related U.S. Application Data

(60) Provisional application No. 60/107,651, filed on Nov. 9, 1998.

(30) Foreign Application Priority Data

Mar. 20, 1998 (FI) ...................................... 980638

(51) Int. Cl.⁷ .............................................. H04B 7/00
(52) U.S. Cl. .................... 370/310.1; 370/468; 370/463
(58) Field of Search ............................. 370/310, 310.1, 370/310.2, 328, 329, 338, 341, 352–356, 370/465, 466, 467, 468, 229, 463, 469

(56) References Cited

U.S. PATENT DOCUMENTS

| | | | |
|---|---|---|---|
| 5,390,171 A | | 2/1995 | Storm |
| 5,497,373 A | | 3/1996 | Hulen et al. |
| 5,539,744 A | | 7/1996 | Chu et al. |
| 5,638,371 A | * | 6/1997 | Raychaudhuri et al. .. 370/310.2 |
| 5,673,253 A | | 9/1997 | Shaffer |
| 5,726,985 A | | 3/1998 | Daniel et al. |
| 5,729,536 A | * | 3/1998 | Doshi et al. ................. 370/398 |
| 5,787,080 A | * | 7/1998 | Hulyalkar et al. ........ 370/310.2 |
| 6,577,607 B1 | * | 6/2003 | Mitts et al. .............. 370/310.1 |
| 6,661,806 B1 | * | 12/2003 | Eriksson et al. ............. 370/468 |

FOREIGN PATENT DOCUMENTS

WO          96/04762          2/1996

OTHER PUBLICATIONS

Rissanen, "Software Radio", UMTS Technology and Services, Oct. 30-31, 1997, Hotel Kalastajatorppa, Helsinki.
Mitola, "The Software Radio Architecture", IEEE Communications Magazine, vol. 33, No. 5, May 1995, pp. 26-38.

* cited by examiner

*Primary Examiner*—Ajit Patel
(74) *Attorney, Agent, or Firm*—Nioxn & Vanderhye, P.C.

(57) ABSTRACT

The present invention relates to a telecommunications system, and further to a method, a board unit and a device rack for a telecommunications system. The system comprises at least one base station node, a base station controller node for controlling said at least one base station node, a switching center node operationally connected to said base station controller node for handling the traffic from and to said at least one base station node. According to the invention, at least one of the nodes provides functionality for use in the operation of the telecommunications system, and a software configurable board unit providing genera: purpose resource is implemented within said at least one node, the arrangement being such that the functionality of the board unit can be changed in accordance with particular requirements of the telecommunications system.

32 Claims, 6 Drawing Sheets

METHOD, ARRANGEMENT AND APPARATUS FOR TELECOMMUNICATIONS

This application claims the benefit and priority date of U.S. Provisional Patent Application Ser. No. 60/107,651, entitled "Method, Arrangement and Apparatus for Telecommunications", filed Nov. 9, 1998, which is incorporated herein by reference.

BACKGROUND

1. Field of the Invention

The present invention relates to a method for increasing the flexibility and use of a telecommunications system. The invention relates further to a telecommunications system. The present invention relates also to an ATM board unit and a board rack arrangement for use in a telecommunications system.

2. Related Art and Other Considerations

A typical radio telecommunications system or Public Land Mobile Network (PLMN) comprises Base Stations (BS), Base Station Controllers (BSC) (which may also be referred to as Radio Network Controllers (RNC)) and Mobile Switching Centers (MSC). A BS is typically formed by one or several Base Transceiver Stations (BTS). The arrangement is such that the BTSs are capable of communicating with Mobile Stations (MS), such as mobile or cellular telephones, via a radio interface. A MSC is in turn arranged to provide an interface between the PLMN and an ordinary fixed network, such as a Public Switched Telephone Network (PSTN) or a Plain Old Telephone System (POTS). The PLMN thus comprises different kinds of nodes (MSCs, BSCs, etc.) arranged at appropriate positions in the network and capable of handling different kinds of information and providing different kinds of functionality to the network system, as will he described in more detail later.

Two common PLMN systems are based respectively on CDMA (Code Division Multiple Access) and TDMA (Time Division Multiple Access). For example, the IS-95 standard used in the USA is based on CDMA, whilst the widely used GSM standard (Global System for Mobile Communication) is based on TDMA. The principles of CDMA and TDMA are well known by the person skilled in the art of mobile communications, and are also specified by the international telecommunication organizations such as ITU-T (International Telecommunication Union-Telecommunication sector) and ETSI (European telecommunication Standard Institute), and are thus not explained in detail herein. It is sufficient to note that in CDMA systems different calls may be communicated using the same frequency but separated from each other by specific codes, whereas in TDMA systems the separation is accomplished by means of respective time slots reserved for each of the calls. The recent development of PLMNs is leading towards so called Wideband Cellular Systems (WCS) which are capable of supporting multimedia services, such as moving images and video. An example of a WCS is W-CDMA.

As mentioned above, in a PLMN, different kinds of information and/or operations are handled in different nodes thereof. A BSC node can be mentioned as one example, this node providing a large number of functions that need to be allocated to the available processing resources.

For example, present BSCs of cellular systems use pooled voice encoders/decoders (CODECs) for voice traffic. Each CODEC in the pool forms a resource which is handled and connected for a voice call when the need arises. Conventional systems have one CODEC allocated per Transceiver (TRX) or per user channel regardless of whether or not this is used. Data calls are also connected through the CODEC, although the function of the CODEC is passive in this case.

BRIEF SUMMARY OF THE INVENTION

Even though the prior art arrangements have proven to operate satisfactorily with those conditions which existed when they were designed, the shortcomings and limitations of the prior art are increasing as more and more new services and features for are introduced in the telephony systems. Thus, there is a need for more complicated and powerful functionality in telecommunication systems. This is particularly so in the field of cellular systems, in which the new services and/or features cannot be handled by means of pooled resources within a particular node.

In addition to the above, in a Wideband Cellular System (WCS) supporting multimedia services, the characteristics of the required radio resources vary during the ongoing call(s) established by the mobile subscriber, and this sets additional requirements concerning the flexibility and management of the operation of the system and the functional allocation of resources within the Wideband Radio Access Network (WRAN) consisting of Base Transceiver Stations (BTSs) and Radio Network Controls (RNCs). A disadvantage relating to the CODECs has been that in the configuration described above it is not possible to dynamically scale and/or optimize the number of the CODECs with respect to utilization, Furthermore, when trying to solve the problems relating to the insufficient flexibility of a node, the prior art has not been able to present an appropriate solution in view of the following issues: flexibility with respect to the required processing power and the amount of memory required by different applications (services), buffering, especially when high speed data services are concerned, and effective resource handling of the pooled devices and minimizing of the channel fragmentation.

Therefore, it is an object of the present invention to overcome the disadvantages of the prior art and to provide a new solution for handling and/or processing different kinds of services and/or features and/or information within a telecommunication system.

An object of the present invention is to provide a solution which enables a large pool of reconfigurable resources that may be capable of handling various kinds of services within the system, and which solution enables a more optimized use of the pooled devices and network elements.

An object of the present invention is to provide a solution by means of which functional features of a telecommunications network may be changed in a flexible manner.

An object of the present invention is to provide a solution by means of which it may be possible to simplify the general configuration of the system, to minimize the number of required components and to decrease the amount of different kinds of components, and thus to decrease the overall design, buildup, and maintenance costs of the system.

It is an object of the present invention to provide a method and an arrangement by means of which the reconfiguration of the functionality of the system may be accomplished by means of programmable units.

Other objects and advantages of the present invention will be brought out in the following part of the specification taken in conjunction with the accompanying drawings.

The objects are obtained by a method of operating a telecommunications system comprising a plurality of telecommunication nodes interconnected by communication channels, each node processing data relating to terminals connected to the telecommunications system and having a data processing functionality. The method comprises a step of dynamically configuring the functionality of at least one node of the telecommunication system by installing or modifying software in at least one board unit of said node.

According to a preferred embodiment a telecommunications system comprises at least one base station node, a base station controller node for controlling said at least one base station node, a switching center node operationally connected to said base station controller node for handling the traffic from and to said at least one base station node. According to the invention, at least one of the nodes provides functionality for use in the operation of the telecommunications system, and a software configurable board unit providing general purpose resource is implemented within said at least one node, the arrangement being such that the functionality of the board unit can be changed in accordance with particular requirements of the telecommunications system.

The invention provides further a printed board unit, which comprises an ATM interface, a board processor unit, a digital signal processor, an operational connection between the ATM interface and the board processor unit, an operational connection between the board processor unit and the digital signal processor, and an operational connection between the application and the ATM interface. The arrangement of the board unit is such that the board processor unit forms a general purpose resource and is capable of changing the functionality of the digital signal processor, whereafter the digital signal processor provides changed functionality towards the ATM interface.

The invention provides also a device rack for a telecommunications node, comprising several multifunction board units, interface towards the node, means for operationally connecting the multifunction board units and the interface. The arrangement is such that the functionality of at least one of the multifunction boards can be changed by means of software in accordance with the needs of a certain telecommunications system.

Several advantages may be obtained by means of the present invention, since the solution provides a reliable and controllable manner for reconfiguring the features of a telecommunications system, while the total number and the variety of different kinds of components needed in the system can be reduced.

The inventive solution may be used for a large variety of different kind of applications in various nodes of a telecommunications system, especially in a mobile telecommunications system. The invention makes it possible to allocate multiple functions to better meet the actual traffic needs in the system and also to meet the future combinations of services. The solution may provide means for obtaining sufficient amount of memory to fulfill the needs of high speed data services. A required bandwidth for inter-processor communication may be achieved independently of the physical location of the adjacent processors. Thus the granularity of the system can be at the signal processor level rather than at the board level making it easier for the resource handler to manage the pooled resources or objects optimally. In addition, several channels/devices may be run under one processor. The invention may assist further in eliminating the channel fragmentation problem.

In the following the present invention and the other objects and advantages thereof will be described in an exemplifying manner with reference to the annexed drawings, in which similar reference characters throughout the various figures refer to similar features.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
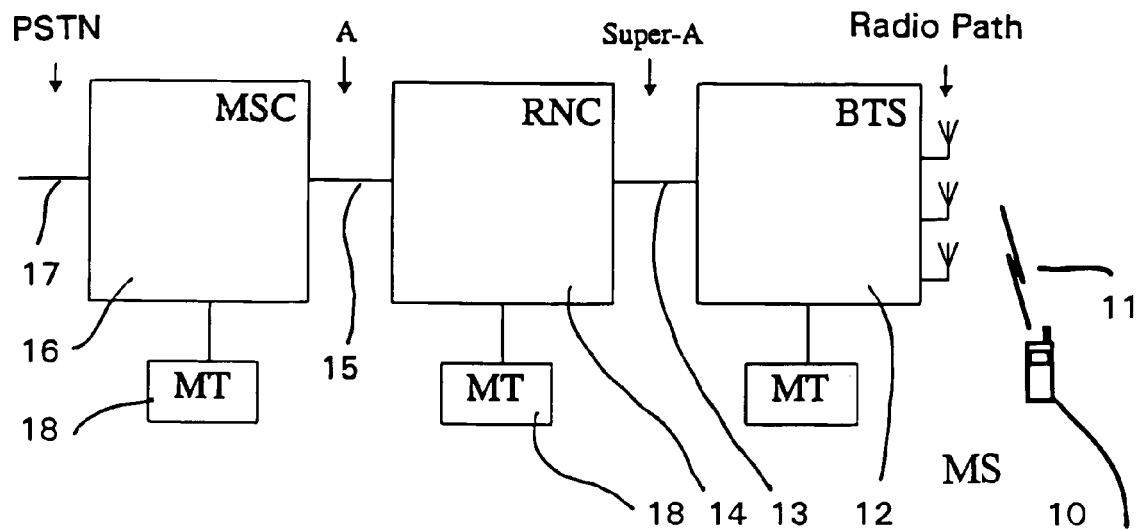
FIG. 1 is a schematic presentation of a Wideband Cellular System (WCS)

FIG. 1 is a schematic presentation illustrating the general arrangement of a Wideband Cellular System (WCS) so as to give an example of the environment in which the invention can be implemented. The WCS contains a Base Station (BS) 12 arranged to communicate via an air interface 11 with a Mobile Station (MS) 10, a Base Station Controller (BSC) 14, and a Mobile Switching Center (MSC) 16. The BS 12 is controlled by the Base Station Controller (BSC), which may also be referred to as a Radio Network Controller (RNC). In addition to this control function, the BSC 14 can be arranged to switch the connections between mobile stations.

It is to be noted that even though this schematical presentation shows only a single network node of its kind, a mobile network usually includes several BSs, BSCs and in most cases also more than one MSC.

In the example of FIG. 1 the interface 13 between the BS 12 and the BSC 14 is of the so called "Super A-type". The Super A connection can be defined as an ATM (Asynchronous Transfer Mode) based connection which may, for example, have a transfer rate of 1.5 Mb/s for each base station BS. The connection between the BSC 14 and the MSC 16 is, in turn, implemented by the so called "A-connection", the transfer rate thereof being e.g. 4×1.5 Mb/s for each BSC. The MSC 16 is connected e.g. by a 155 Mb/s data connection 17, such as an optical fiber cable connection, to a local ATM network (not shown, but which may be e.g. an ATM LAN; ATM Local Area Network using IP protocol) so as to enable transmission of data packets between the ATM network and the MSC 16.

FIG. 1 shows also Maintenance Tools (MT) 18 operationally connected to each of the MSC 16, BSC 14 and BS 12. In practice a MT resource might be implemented by means of a portable computer of similar means and suitable software.

Figure 2:
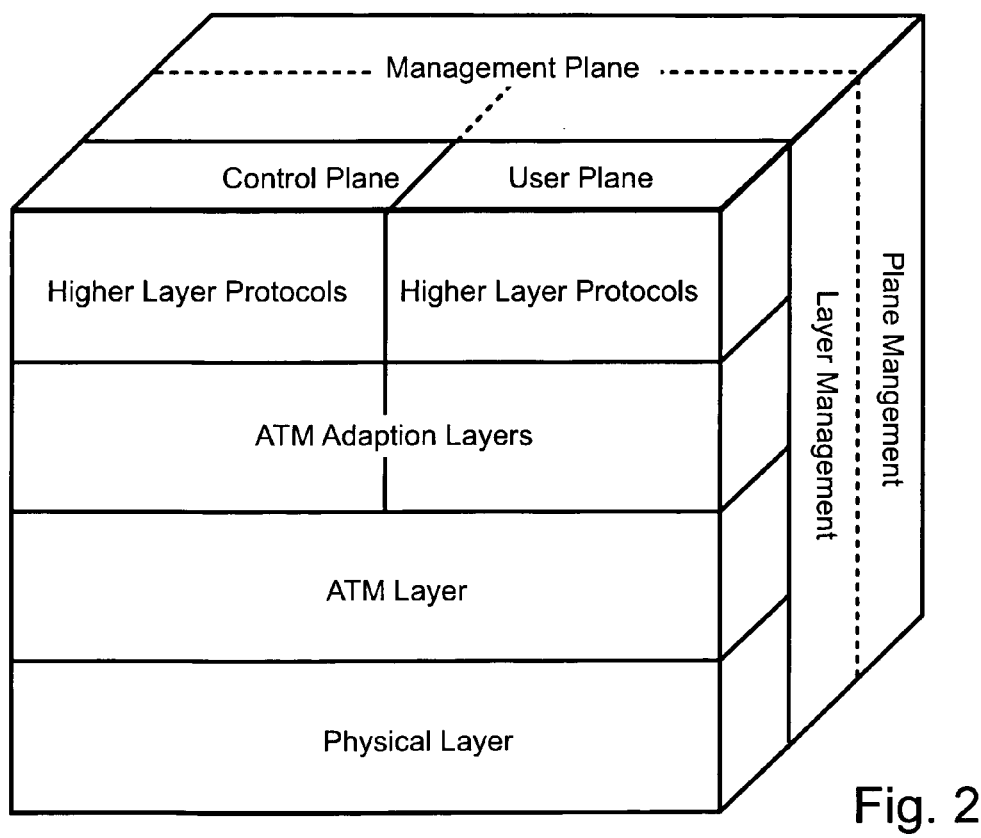
FIG. 2 discloses a B-ISDN reference protocol model.

The following short explanations for some of the terms and meanings relating to the ATM technology and used in this specification are given so as to aid the understanding of the described examples:

ATM is a cell based switching and multiplexing system standardized by ITU-T, ANSI (American National Standards Institute), ETSI, and ATM forum. The ATM format is used e.g. in ITU-T standards for a B-ISDN (Broadband Integrated Services Digital Network; for more details, see e.g. ITU-T. Recommendation I.321, B-ISDN Protocol Reference Model and its Application, 1991), and thus FIG. 2 discloses a B-ISDN protocol reference model so as to clarify the ATM format. The model is divided into layers and planes. From these the planes are responsible for the actual transfer of the information (user plane), signalling (control plane) and management of the network (management plane). Each of the planes is, in turn, divided into four layers: Physical Layer (PHY), ATM layer, ATM Adaptation Layers (AALs) and Higher layers. Of these the PHY is responsible for the actual transfer of bits, the ATM layer is responsible for the switching and multiplexing of ATM cells and the Higher layers include all the higher layer tasks. The function of the AALs is to adapt various services to the ATM cell format. The virtual ATM connections carried above the AALs may either have a Constant Bit Rate (CBR) or an Unspecified Bit Rate (UBR).

The ATM "cell" is the basic transmission unit of the ATM. The standardized size of the cell is 53 bytes, from which the 5 first bytes form the headnote and the remaining 48 bytes the actual load. Regardless of the used layer, all ATM traffic is carried and switched in cells.

The services of the AAL layer can be divided in four classes A to D. The AAL signalling is divided in different types which are used in accordance with the service class and the connection type. These types are e.g. AAL1, AAL2, AAL2', AAL3/4, and AAL5. The network nodes need functionality which enables conversion between the above types (e.g. from AAL2 to AAL2')

Figure 3:
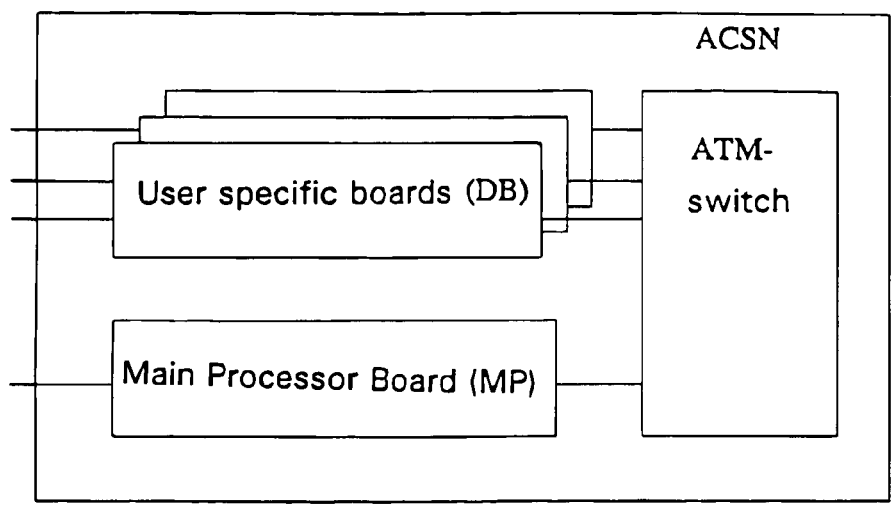
FIG. 3 discloses a possible structure for an ATM Cell Switching Network (ACSN) node.

FIG. 3 discloses a general structure of an ATM Cell Switching Network (ACSN), which is a platform designed for the handling of the ATM traffic. An ASCN comprises typically general hardware and software modules. The basic element thereof is an ATM switch and the related software, which is often referred to as a Spatial Switching (SPAS). The system is controlled by several modules, such as a Control System module, SNMP Element Management module and ATM Cell Transport module. By adding application specific modules to these it is possible to obtain ACSN nodes, such as the BSC or the MSC. In the ASCN of FIG. 3 the ATM switch is implemented as an Application Specific Integrated Circuit (ASIC) in the backplane of a rack. However, it is to be noted that the ATM switch can be implemented within each of the subracks, as is disclosed e.g. by FIG. 6. The higher level control is implemented by the Main Processor Board (MPB). All the application specific functions and connections elsewhere than to the ATM switch are implemented by user specific boards (DB, Device Board).

A software configurable application processor platform, which can process both user and control plane information above the ATM layer in a flexible manner provides the basis of a general purpose processing resource. The resource is configurable to provide, for example, different kind of functionality, a MSC, BSC or BS node. The processor platform can be a Digital Signal Processor (DSP) platform, as shown in the particular embodiments illustrated herein, or other types of processors such as a reduced instruction set (RISC) processor.

Figure 4:
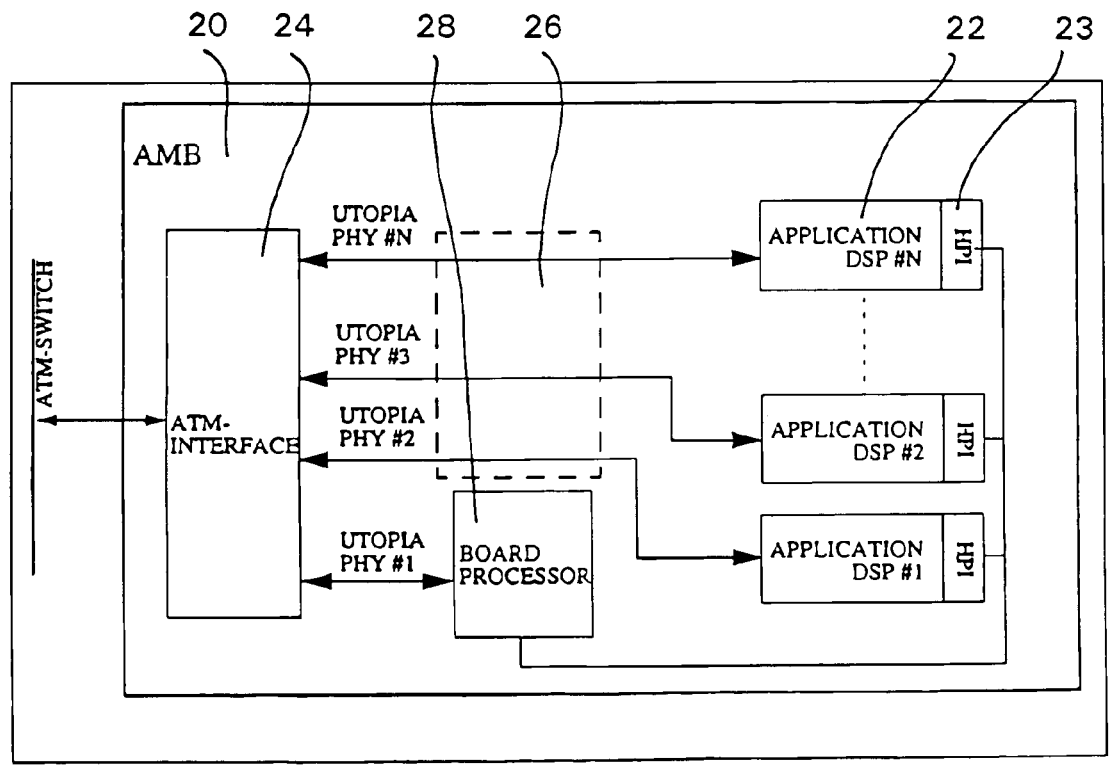
FIG. 4 is a block diagram for an ATM Multifunction Board (AMB) arrangement according to one embodiment of the present invention.

FIG. 4 discloses a block diagram of a board unit providing one example of the general purpose processing resource. As disclosed, the resource may be in the form of a general purpose configurable board 20 which in the following will be referred to as an ATM Multifunction Board or AMB. The implementation of this is a configurable general purpose printed board assembly which has processing capacity to serve a lot of services with different characteristic requirements.

The AMB assembly 20 contains a number of processors (e.g., Digital Signal Processors [DSPs]) 22 together with an ATM interface or ATM switch port 24 (Asynchronous Transfer Mode switch port). The switch port 24 connects the AMS to the ATM switch core in a device rack or subrack (for the racks, see e.g. FIG. 6). All user and control plane communications to and from the AMB take place through this port 24.

The processing pool consists of a number (e.g. 4) of application processors 22. Examples of possible processors are those of C54x and C6x families by Texas Instruments™ (e.g. C548 and C6201, respectively). The number of processors 22 on a board is limited mainly by two factors: power consumption and the possibility to connect them to the ATM switch.

Application related programs are run on the application processors 22, and are thus named in FIG. 4 as Application DSP #1–Application DSP #N. In one mode of the invention illustrated in FIG. 4, each processor 22 has it's own multi-PHY address in the ATM switch port interface circuit 24. In this way it is possible to eliminate the need for all additional Mux/Demux logic schematically shown by dashed line box 26 in FIG. 4. This Mux/Demux logic could easily form a bottleneck in the system, especially when high speed data services are processed. The elimination of the Mux/Demux logic provides a significant advantage in the overall operation of the AMB, However, it should be understood that, in another mode of the invention, logic depicted by box 26 can be utilized consistent with the aspects of the invention, e.g., dynamic configuring of resources and functionalities. Usage of such the Mux/Demux logic in the form of a router is understood, e.g., with reference to U.S. patent application Ser. No. 09/188,097, entitled "Centralized Queuing For ATM Node", filed Nov. 9, 1998, which is incorporated herein by reference.

The control plane signalling is routed via a Board Processor (BP) 28, which has it's own multi-PHY address. The EP operates under a Main Processor that belongs to the devices disposed in the device rack or subrack of FIG. 6.

Each of the application processors 22 has a Host Port Interface (HP) 23. Each HPI 23 is connected to an external data memory space of the BP 28. The HPI is used mainly for the administration of the configuration operations of the AMB board 20 (loading or upgrading or amending of DSP software etc. operations).

The arrangement of the AMB 20 is such that there exists full freedom to load all of the processors on the board with any application software. The application processors 22 may be provided with external data memory, and thus it is also possible to fulfill the requirements (e.g. for the buffering) of high speed data services.

FIG. 4 discloses further UTOPIA (Universal Test & Operations PHY Interface for ATM) buses between the respective application processors 22 and the ATM-interface and also between the Board Processor 28 and the ATM interface. The UTOPIA bus definition enables a connection of eight PHY devices to an ATM device (a multi-PHY technique). Each of the devices may provide four physical ports, wherein the handshaking signals are connected by an external logic. The maximum amount of application processors on one board would thus be 28, since one bus is reserved for the Board Processor. The UTOPIA buses are standardized and at present considered as a preferred alternative to provide the connections.

By replacing e.g. a router processor between each application processor 22 and the ATM Interface 24 a significant advantage is obtained by removing the limitations that this router (or similar) sets for the data processing capacity. In addition, by connecting each application processor 22 directly to its own UTOPIA Multi-PHY branch, the required bandwidth for interprocessor communication within the AMB is achieved independently of the physical location of the adjacent processor, which can be on the same AMB or on another board in the same subrack, or even in another subrack or in another node of the system. Thus the granularity of the system can be in the application processor level rather than in the board level. This also makes it easier for the resource handler to manage the pooled objects in an optimal manner.

Figure 5:
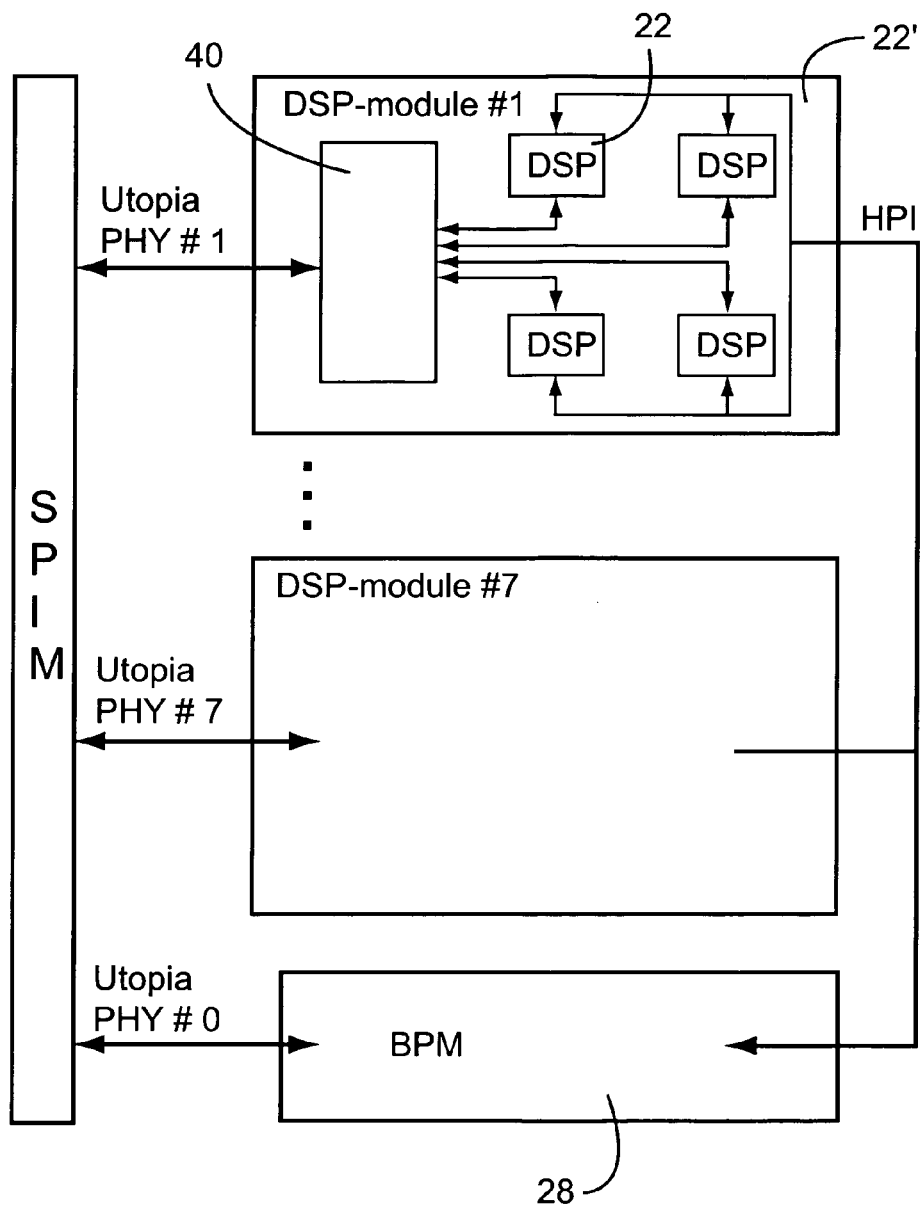
FIG. 5 discloses another possible AMB.

FIG. 5 discloses an alternative embodiment for the AMB. In this the processors are provided by seven application processor modules 22' #1 to #7 containing a plurality of application processors 22 connected to each other by means of an interface logic 40. This may be implemented by means of an ASIC circuit forming the application processor module 22'. These application processor modules 22' are then connected by means of UTOPIA buses to a Switch Port Interface Module (SPIM). The SPIM forms the interface or switch between the AMB and the network, and is responsible for the routing of the ATM cells. The arrangement of FIG. 5 enables a board unit to be provided which contains 28 processors.

Figure 6:
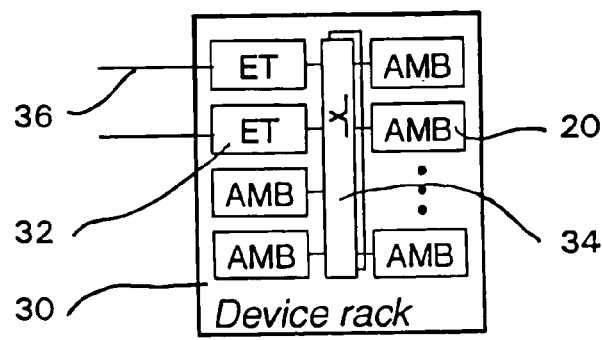
FIGS. 6 to 8 disclose schematically certain embodiments of the present invention.

As can be seen from FIG. 6, the AMBs may be disposed in a device rack 30 (e.g. so called ATM switch rack) belonging to a PLMN node and containing several AMBs so as to form a pooled resource of the system. In addition to the AMBs 20, the rack 30 includes Exchange Terminal (ET) board 32 and a switching apparatus 34 arranged between the various components of the rack 30. The Exchange Terminal boards 32 provide the interface between different racks and nodes via connections 36. An example of a suitable switching apparatus 34 is shown in U.S. patent application Ser. No. 08/188,101, entitled "Asynchronous Transfer Mode Switch", filed Nov. 9, 1998, which is incorporated herein by reference.

The arrangement is such that the AMBs and/or individual application processors of each AMB can be loaded/updated with the required software e.g. during the installation to take different tasks during the system start up. It is also possible to reconfigure the AMBs or the DSPs thereof during the operation of the system. This can be done e.g. by means of the Maintenance Tools 18 of FIG. 1.

The following are some examples of the functions the AMB can implement to be accomplished in a BSC node:
Macro Diversity handover combination/splitting (DHT; Diversity Handover Trunk) in a CDMA system:
DHT receives ATM cells transmitted by a mobile station (MS) from an ALT board, and controls the handovers of the MS between different base stations.
Coder/Decoder (CODEC) for voice
Echo Canceller
UDI (Unrestricted Digital Information) adapter for circuit data (UADP;
UDI adapter for data processing)
Packet data adapter for packet data (PADP; Packet Adapter for Data Processing):
This adapts the packet data traffic for radio path transmission.

According to further exemplifying embodiments, the following functions can also be implemented by means of the AMB:
IPR board connected to a MSC node. The IPR (Internet Packet Router) board routes IP packets between a mobile station and a fixed telephone network.
ALT board connected to a BSC or BTS node. The ALT (ATM & AAL2 Link Termination) board is used for converting an AAL2' cell into AAL2 cells. The ALT board may also be used to prioritize the traffic in both ATM and in AAL2 levels.
SMX board connected to a BTS node. The SMX (Service Multiplexer) board is used for converting AAL2' cells into AAL5 cells.

Figure 7:
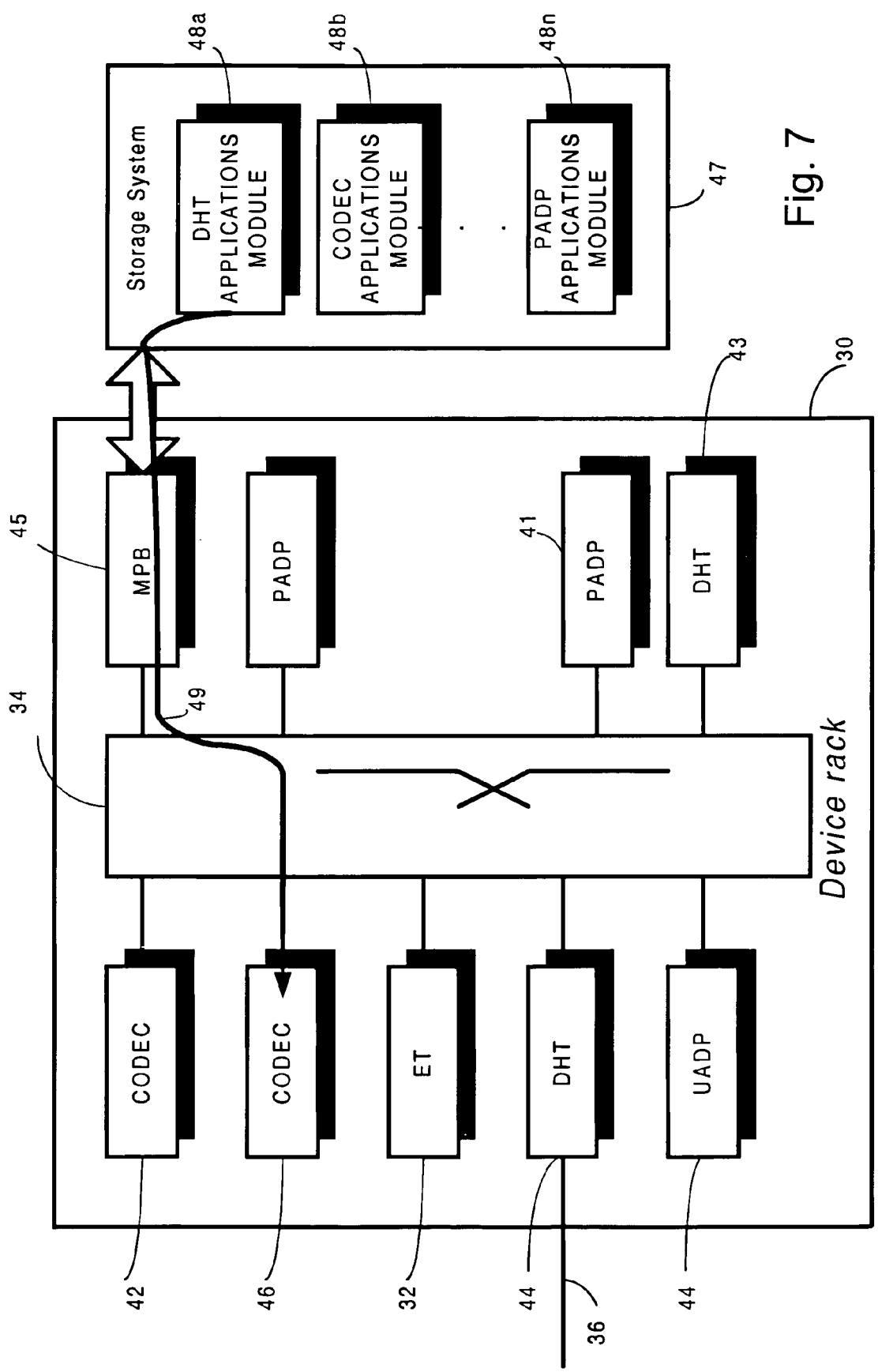

FIG. 7 discloses an embodiment providing a BSC node within an ATM switch rack 30 which is designed according to the needs on a given time and place. In this the AMBs are configured to form, from the above mentioned alternatives, PADPs 41, a CODEC 42, a DHT 43 and a UADP 44. A main processor board (MPB 45) is also included in the BSC node and connected, e.g., to send/receive control cells and download functionalities via switch 34.

Figure 8:
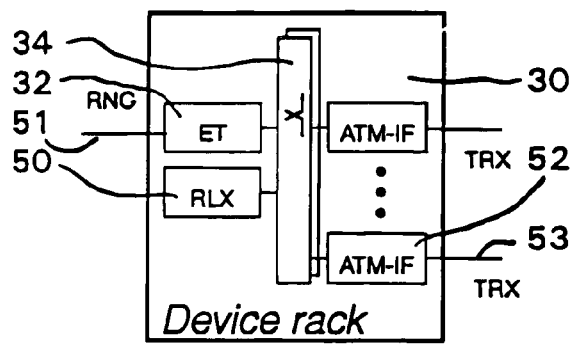

FIG. 8 discloses an example of the functions the AMB is capable of implementing in a Base Station node. According to this, the implemented function is Radio Link Multiplexer (RLX), which is involved for instance in the Medium Access control (MAC) functionality of the W-CDMA system. A main processor board (MPB) is also included in the base station node of FIG. 8 and is connected, e.g., to send/receive control cells and download functionalities via switch 34.

An important feature of the embodiments described here is that the subracks containing AMB boards can be configured according to the actual and current needs existing in the used system. For example, mobile station to mobile station (MS to MS) connections require only DHT (Diversity Handover Trunk) functionality, but mobile station to fixed line connections require also CODEC and/or UADP functions. The number of DHT boards relative to the CODEC and/or UADP boards, i.e. the combination or "mix" between the different boards, can be altered during the operation of the system so as to provide an optimal functionality to meet the needs of the traffic. In other words, the mix between the required functionalities, which are different applications of the AMBs, are adapted to the actual and current needs of the system.

To give an example, if the number of MS to MS connections increases in the system, more DHTs are needed. In this case it might be expected that the number of CODECs may be decreased, as the total amount of connections is not expected to increase as much as the number of the MS to MS connections, and thus one or several of the CODECs could be reconfigured to form one DHT or even several DHTS. Correspondingly, if the number of packet data users increases, more PAPDs are required etc.

The possibilities and alternatives to select the most appropriate AMB (or application processor) for the reconfiguration may be based on statistical information or other logical rules, and the selection is controlled by the main controller of the subrack or by the board processor. According to one alternative, the AMB (or application processor) to be reconfigured is the first AMB (or application processor) in ascending (or descending) order which is not in an active state at the moment the new task/need for a change is determined.

This gives a remarkable increase in the flexibility of the system, as each AMB, or in fact each application processor on the AMB board, can be loaded with a needed application software, and thus reconfigured in an appropriate manner. The chosen application processor architecture has characteristics of both the conventional application processors and RISC processors making it more suitable for a variety of different applications in various nodes of a mobile telecommunications system. As the processing power of the used processor architecture, as well as the amount of memory per processor, are both high, especially in the case that an external memory is used, relative to the requirements of typical applications, several channels/devices can be run under one processor. This assist also in eliminating the channel fragmentation problem that would be encountered if the data service applications of various bit rates would be reserved and released on a platform consisting of less efficient processors.

Figure 9:
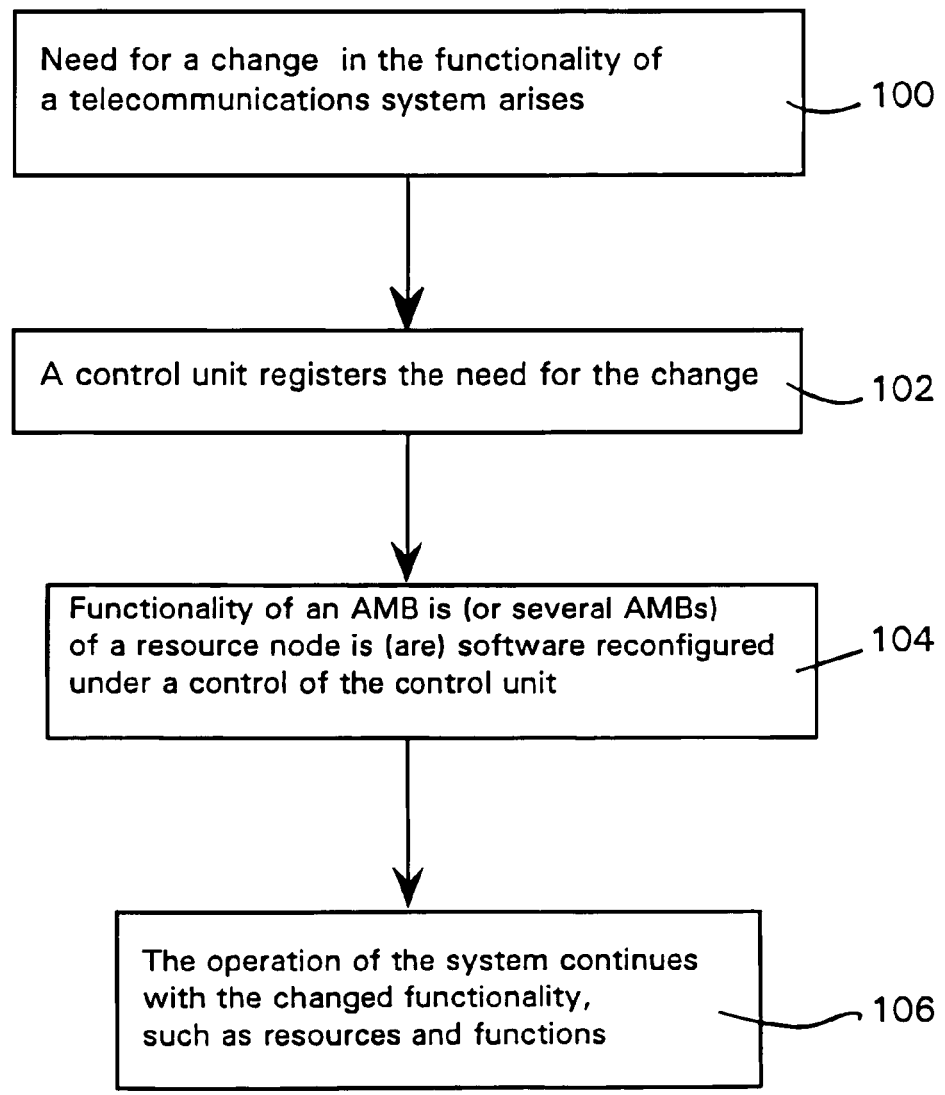
FIGS. 9 and 10 disclose flow charts in accordance with two embodiments of the present invention.

FIG. 9 discloses a flowchart for exemplifying the operation of preferred embodiments of the invention. At step 100 a need for a change in the operation of the telecommunications network arises, the change being such that it causes a need for a change in the functionality of the system resources (such as the changes explained e.g. in connection with FIGS. 6 and 7). At step 102 the system control unit, such as a Main Processor Board (MPB) of BSC, determines that the telecommunication system requires a different allocation of resources than before. At step 104, the functionality of an application processor, the entire AMB (all application processors on an AMB), or several AMBs is reconfigured such that the necessary changes are performed. The procedure is controlled by the control unit. After the reconfiguration the operation of the system continues with the new resource "mix" or combination, step 106, until a need for a further change arises.

For example, if the BSC node of FIG. 7 detects that the number of mobile station (MS) to MS connections has increased in the system to an extent that more DHTs are needed, the main processor board (MPB 45) of BCS node ascertains whether there are any processors in the node which are spare or which could be converted from a prior functionality to a DHT functionality. In the situation of increased MS to MS connections, it is likely that less CODEC functionality is required at the BSC node. Therefore, the main processor board (MPB 45) determines that the CODEC functionality illustrated by one processor 46 in FIG. 7 can be replaced by a DHT functionality. Therefore, as indicated by step 104 of FIG. 9 and depicted by arrow 49 in FIG. 7, the main processor board (MPB 45) downloads an applications module with DHT functionality to processor 46. In this regard, and as illustrated in FIG. 7, main processor board (MPB 45) has connected thereto a storage system 47 (such as a hard disk) which has stored thereon applications modules of differing functionality. For example, FIG. 7 shows that storage system 47 has DHT applications module 48*a*, CODEC module 48*b*, and PADP module 48*n* stored thereon. In the illustration herein described, the main processor board (MPB 45) downloads a copy of the DHT applications module 48*a* to replace the CODEC functionality at processor 46.

Figure 10:
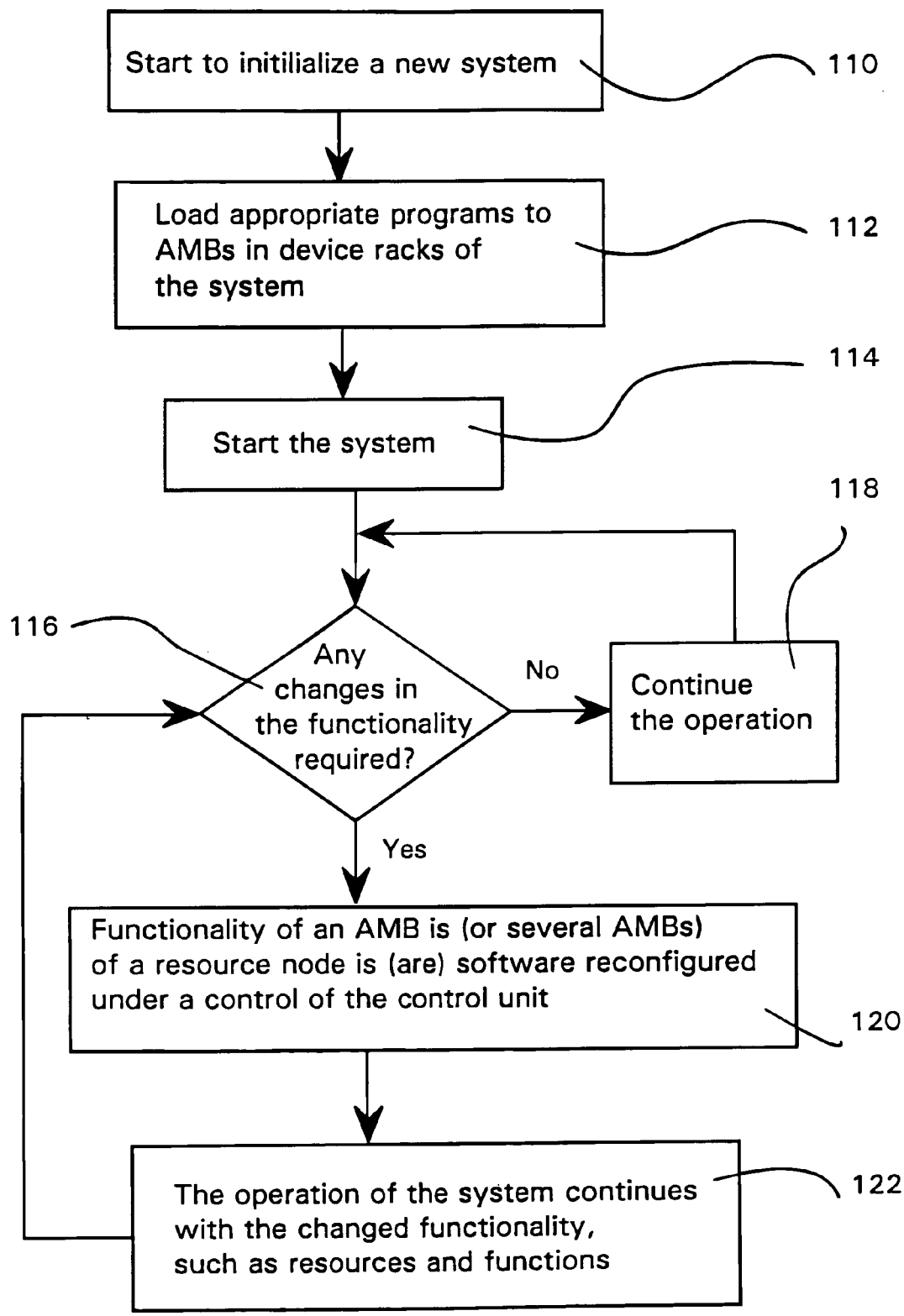

FIG. 10 discloses a flow chart for a situation in which a new system is initialized during the start up thereof. At step 110 the initialization of a new system is started. During the start up new programs are loaded to the AMBs of the system, step 112. After the system has been initialized, the operation thereof is started, step 114. The operation of the system is controlled, and if a need for a change in the functionality is detected at step 116, the system will be reconfigured by changing the functionality of one or more AMBs in an appropriate node, step 120, whereafter the operation of the system continues with the changed functionality, step 122.

Thus, the invention provides a solution by means of which a significant improvement can be achieved in the area of telecommunications. The solution provides means for better meeting the actual traffic needs in a telecommunications system and also for meeting future combinations of the present and possible new services, also in instances in which more general processing resource units, such as the AMB units, are introduced to the system. The arrangement according to the present invention can be realized by per se known components and is reliable in use.

The dynamic configuration of the present invention, e.g., the dynamic configuration of AMBs, can be utilized for various advantages. For example, using the dynamic configuration procedure of the present invention one can apportion or assign the node functionalities among plural boards (AMBs) in order to have an essentially equal bandwidth demand for all racks or subracks of the node, thereby utilizing interconnection links (with a certain bandwidth) optimally with feasible delay.

It should be noted that the foregoing examples of the embodiments of the invention are not intended to restrict the scope of the invention defined in the appended claims. All additional embodiments, modifications, similarities, alternatives and applications obvious to those skilled in the art are thus included within the spirit and scope of the invention as set forth by the claims appended hereto.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system, comprising
at least one base station node,
a base station controller node for controlling said at least one base station node,
a switching center node operationally connected to said base station controller node for handling traffic from and to said at least one base station node, wherein
at least one of the nodes provides Asynchronous Transfer Mode (ATM) cell-handling functionality for use in the operation of the telecommunications system, and
a software configurable board unit providing a general purpose ATM cell-handling resource is implemented within said at least one node, the arrangement being such that the ATM cell-handling functionality of the board unit can be changed in accordance with particular requirements of the telecommunications system.

2. A telecommunications system according to claim 1, wherein the traffic is handled by means of ATM connections.

3. A telecommunications system according to claim 2, wherein the board unit comprises a software-configurable ATM Multifunction Board.

4. A telecommunications system according to claim 3, wherein the ATM Multifunction Board comprises a board processor and at least one application processor.

5. A telecommunications system according to claim 3, wherein the ATM Multifunction Board comprises application processor modules, each module comprising one or more application processors and an interface logic.

6. A telecommunications system according to claim 1, wherein said at least one node comprises plural board units forming a pooled resource.

7. A telecommunications system according to claim 1, wherein said at least one node comprises plural board units arranged within a device rack.

8. An Asynchronous Transfer Mode (ATM) node of telecommunications system, the node comprising:
    an ATM switch;
    a board unit, the board unit comprising:
        an ATM interface connected to the ATM switch,
        a board processor unit,
        an application processor which handles ATM cells,
    wherein the arrangement of the board unit is such that when the board processor unit selectively changes an ATM cell-handling functionality type of the application processor, thereafter the application processor provides a changed ATM cell-handling, functionality type towards the ATM interface.

9. A node according to claim 8, further comprising a direct UTOPIA bus which connects the ATM interface with the application processor.

10. A node according to claim 8, further comprising a direct UTOPIA bus which connects the ATM interface with the board processor unit.

11. A node according to claim 8, further comprising a direct UTOPIA bus which connects the board processor unit with the application processor.

12. A node according to claim 8, comprising plural application processors formed by application processor modules comprising one or more subprocessors and interfacing logic.

13. A node according claim 8, wherein the board unit is a software configurable multifunction board capable of forming at least one of the following resources: DHT board, CODEC board, EC board, UADP board, PADP board, IPR board, ALT board or SMX board.

14. A device rack for an Asynchronous Transfer Mode (ATM) telecommunications node, the node being one of a base station node, a base station controller node, and a mobile switching center node, the node comprising
    plural multifunction board units,
    an interface towards the node,
    connections between the multifunction board units and the interface, wherein
    an ATM cell-handling functionality type of at least one of the multifunction boards can be changed by a software change in accordance with the needs of a telecommunications system in which the node operates.

15. A node according to claim 14, wherein a combination of the different ATM cell-handling functinonalities are provided by the multifunction board units, the combination of the ATM cell-handling functionalities being reconfigurable under control of a control unit during the operation of the telecommunications node.

16. A method of operating a node of a cellular telecommunications network, the node comprising plural board devices, each of the plural board devices having at least one functional processor, differing types of ATM cell-handling telecommunications functionalities being distributed among functional processors of the node in accordance with an existing ATM cell-handling functionality distribution; the method comprising:
    (1) detecting a change in resource requirements in the node; and
    (2) dynamically changing the ATM cell-handling functionality type of at least one of the functional processors during operation of the node and in response to detection of the change in requirements, thereby providing a changed ATM cell-handling functionality distribution within the node.

17. The method of claim 16, wherein step (2) involves changing the ATM cell-handling functionality types of all functional processors on selected board device of the node.

18. The method of claim 16, wherein step (2) involves changing the ATM cell-handling functionality types of all functional processors on plural board devices of the node.

19. The method of claim 16, wherein the node further comprises a node main processor and a switch through which the node main processor and plural board devices are connected, the method comprising using the node main processor to perform at least one of steps (1) and (2).

20. The method of claim 19, wherein the node main processor downloads a new ATM cell-handling functionality type to at least one of the functional processors during operation of the node and in response to detection of the change in requirements.

21. The method of claim 16, wherein the node is one of a base station node, a base station controller node, and a mobile switching center node.

22. The method of claim 16, wherein the node is a base station controller node, and wherein in step (2) the ATM cell-handling functionality type of at least one of the functional processors is changed from one of the following functionalities to another of the following functionalities: (1) macro diversity handover combination/splitting; (2) coder/decoder; (3) echo canceller; (4) unrestricted digital information adapter for circuit data; (5) packet data adapter; (6) internet packet router; (7) AAL link termination; (8) service multiplexer.

23. An Asynchronous Transfer Mode (ATM) node of a cellular telecommunications network comprising:
    a node main processor;
    plural board devices, each of the plural board devices having at least one functional processor, differing types of ATM cell-handling telecommunications functionalities being distributed among functional processors of the node in accordance with an existing ATM cell-handling functionality distribution;
    a switch which interconnects the node main processor and the plural board devices;
    wherein upon detection of a change in resource requirements by the node, the node main processor dynamically changes the ATM cell-handling functionality type of at least one of the functional processors during operation of the node and in response to detection of the change in requirements, thereby providing a changed ATM cell-handling functionality distribution within the node.

24. The apparatus of claim 23, wherein the node main processor changes the ATM cell-handling functionality types of all functional processors on selected board device of the node.

25. The apparatus of claim 23, wherein the node main processor changes the ATM cell-handling functionality types of all functional processors on plural board devices of the node.

26. The apparatus of claim 23, wherein the node is one of a base station node, a base station controller node, and a mobile switching center node.

27. The apparatus of claim 23, wherein the node is a base station controller node, and wherein the node main processor changes) the ATM cell-handling functionality type of at least one of the functional processors from one of the following functionalities to another of the following functionalities: (1) macro diversity handover combination/splitting; (2) coder/decoder; (3) echo canceller; (4) unrestricted digital information adapter for circuit data; (5) packet data adapter; (6) internet packet router; (7) AAL link termination; (8) service multiplexer.

28. An Asynchronous Transfer Mode (ATM) node of a cellular telecommunications network comprising:
a node main processor;
plural board devices, each of the plural board devices having at least one functional processor;
a switch which interconnects the node main processor and the plural board devices;
wherein the node main processor allocates differing types of ATM cell-handling telecommunications functionalities among the functional processors of the node so that there is an essentially equal bandwidth demand for all board devices.

29. The apparatus of claim 28, wherein the node is one of a base station node, a base station controller node, and a mobile switching center node.

30. A method of operating an Asynchronous Transfer Mode (ATM) node of a cellular telecommunications network, the node comprising plural board devices, each of the plural board devices having at least one functional processor, the method comprising allocating differing types of ATM cell-handling telecommunications functionalities among the functional processors of the node so that there is an essentially equal bandwidth demand for all board devices.

31. The method of claim 30, wherein the node main processor downloads a new ATM cell-handling functionality type to at least one of the functional processors during operation of the node to provide the essentially equal bandwidth demand for all board devices.

32. The method of claim 30, wherein the node is one of a base station node, a base station controller node, and a mobile switching center node.

* * * * *